(12) United States Patent
Chen et al.

(10) Patent No.: US 7,559,045 B2
(45) Date of Patent: Jul. 7, 2009

(54) DATABASE-AIDED CIRCUIT DESIGN SYSTEM AND METHOD THEREFOR

(75) Inventors: Che-Ming Chen, Taipei (TW);
Po-Cheng Chiu, Taipei (TW);
Chin-Tien Tseng, Taipei (TW);
Ying-Chun Chen, Taipei (TW);
Cheng-Hsun Ho, Taipei (TW)

(73) Assignee: Inventec Corporation, Taipei (TW)

( * ) Notice: Subject to any disclaimer, the term of this patent is extended or adjusted under 35 U.S.C. 154(b) by 178 days.

(21) Appl. No.: 11/643,891

(22) Filed: Dec. 22, 2006

(65) Prior Publication Data
US 2008/0155483 A1 Jun. 26, 2008

(51) Int. Cl.
*G06F 17/50* (2006.01)
(52) U.S. Cl. ............... 716/6; 716/1; 716/2; 716/17; 703/14
(58) Field of Classification Search ............ 716/1, 716/2, 6, 17; 703/14
See application file for complete search history.

(56) References Cited

U.S. PATENT DOCUMENTS 5,727,187 A * 3/1998 Lemche et al. ............ 716/18

\* cited by examiner

*Primary Examiner*—Thuan Do
(74) *Attorney, Agent, or Firm*—Rabin & Berdo, P.C.

(57) ABSTRACT

A database-aided circuit design system and method therefor is provided, which can be utilized to detect problems of the product in an early design stage through the early design stage error-detection function, by making use of an artificial intelligence simulation database, storing the determination criterions for the optimized circuits, searching for failure generating factors and correcting the errors relative to the problems generated, based on the post production stage error-diagnosis function, in cooperation with the records stored in the artificial intelligence simulation database after the product has been actually produced, thus achieving the reduction of the product design and development costs, shortening the product market delivery time, and raising the competitiveness of the product.

10 Claims, 6 Drawing Sheets

DATABASE-AIDED CIRCUIT DESIGN SYSTEM AND METHOD THEREFOR

BACKGROUND

1. Field of Invention

The invention relates to a database-aided circuit design system and method therefore, and in particularly to a database-aided circuit design system and method having the capability of early design stage error detection and post production stage error diagnosis.

2. Related Art

With the rapid progress and development of system design technology, the complexity and the data volume involved in the related design is increasing rapidly, so that even with the assistance of the Computer Aided Design (CAD) software, the problem discovery, tracing and follow-up trouble shooting are increasingly difficult. Due to the diversity of the individual elements and circuits, the huge amount of design data, the complicated interrelations between the various modules, and the lack of sufficient and effective error-detection mechanism, in the prior art, the fault-detection is conducted through manual inspection, as such the electric voltage in the net-line domain is inspected visually, and in particular concerning the circuit layout of the multi-layer stacked PCB, each of the respective connections must be examined to see if it is properly connected to another net-line domain by visual inspection, that is prone to missing errors, thus leading to the failure of the entire system.

In the prior art, there does not exist a set of circuit design system flow programming to ensure achieving the optimal level of circuit design and component reliability, so that conventionally, the cycle of design, manufacturing, testing, redesign, manufacturing, and testing is repeated all over again, thus requiring tremendous time and manpower to achieve the desired quality of the product. Moreover, if errors are detected through the test instrument after the completion of the assembly of the product, in this situation, usually, there is no way of knowing what causes this error, thus tremendous time and manpower are spent on searching for the cause of component-errors, electric circuits-errors, PCB layout errors, . . . etc, and quite often, most of the trouble-shootings are done manually and depend on the experience of the engineer, which is not only time-consuming and inefficient, but the accuracy of the error analysis is also questionable.

In addition, changing job is quite often for the electronic engineers. Therefore, the working experience is hard to be accumulated for a company, which may lead to erroneous judgment and decision in product developing.

For the electronic industry emphasizing the speed of product development, the above-mentioned problems are not only costly but not easy to be solved. Therefore, the research and development of an improved circuit design system and method therefore that can solve the problems of the prior art is an important task in this field.

SUMMARY OF THE INVENTION

An object of the invention is to provide a database-aided circuit design system and method, which utilize a determination criterion on an artificial intelligence simulation database to detect the problem of the product in the early design stage, and utilize the solutions on the artificial intelligence simulation database to solve the discovered problems of the product after the product is manufactured, thus reducing the production cost, shortening the product market delivery time, and sharpening the competitive edge of the product may be achieved.

To achieve the object, the invention, a database-aided circuit design system is provided. The system includes at least the following devices.

An input module is used to receive the electric characteristic parameters and circuit diagrams input by a user; auxiliary software, such as CAD software, is used to analyze the real life high speed circuit operation; an artificial intelligence simulation database is used to record the restriction criterion, electric model assignment, and model for generated problem, and solution, that are used as the determination criterion for the optimized circuit; an error report module is used to display the problems discovered through the analyses conducted by CAD software by the artificial intelligence simulation database, and receiving the problems input by the user; a comparison module, used to search the problem recorded in the artificial intelligence simulation database, the model for the problem and solution; a modification module, used to modify the input circuit diagrams and electric characteristic parameters of the input components, and then proceed with the computer-aided design and software simulation; an output module, used to output the optimized circuit design thus obtained.

In addition, in order to achieve the object, the invention discloses a database-aided circuit design method, which includes the procedures of early design stage error detection and post production error diagnosis, of which each will be described in detail as follows.

To begin with, the early design stage error-detection procedure is described, including the following steps. Firstly, receiving the circuit diagrams and the component electric characteristic parameters of the products desired to be error-detected as input by the user, and then conducting measurement of the circuit layouts and the distance between layouts. Next, searching in the artificial intelligence simulation database for the related restriction criterions based on the bus terminator, topology, and PCB stack-up in the circuit diagram. Then, performing the detection based on the electric characteristics and parameters of the components to determine if the results of the analysis are compatible with the restriction criterions, if the answer is negative, that means that portion of circuit arrangement is questionable. Finally, conducting the revisions of the circuit design according to the proposed modifications relative to the input problems.

Moreover, the post production error diagnosis procedure is described, including the following steps. Firstly, receiving the related information concerning the problem of the malfunctioning product as input by the user. Next, verifying if the problem is recorded in the artificial intelligence simulation database. Then, if the answer is positive, examining the recorded problem and searching for the possible factors that cause this problem. Subsequently, outputting the solutions to the problems of product malfunction and the failures of its electric characteristics, according to the circuit diagrams and the component electric characteristic parameters of the product. Finally, upon finishing the modifications of the circuit design according to the proposed solution, conducting the error detection again to determine and make sure if the errors have indeed been eliminated, thus achieving the objective of the invention of automatic high speed early design stage error detection and post production error diagnosis of the circuit design.

Further scope of applicability of the invention will become apparent from the detailed description given hereinafter.

However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will become more fully understood from the detailed description given below for illustration only, and thus is not limitative of the present invention, wherein.

DETAILED DESCRIPTION OF THE INVENTION

The purpose, construction, features, and functions of the invention can be appreciated and understood more thoroughly through the following detailed description with reference to the attached drawings.

The invention discloses a database-aided circuit design system and method therefore, which will be set forth in detail in the following descriptions to provide a complete and thorough understanding of the invention. However, for the people familiar with this field, the invention may be implemented without utilizing these specific details, or it may be implemented by means of alternative elements or methods. Unless otherwise specified, the well-known methods, procedures, elements, and circuits will not be specifically described in detail, so as not to unnecessarily obscure the essence of the invention.

Figure 1:
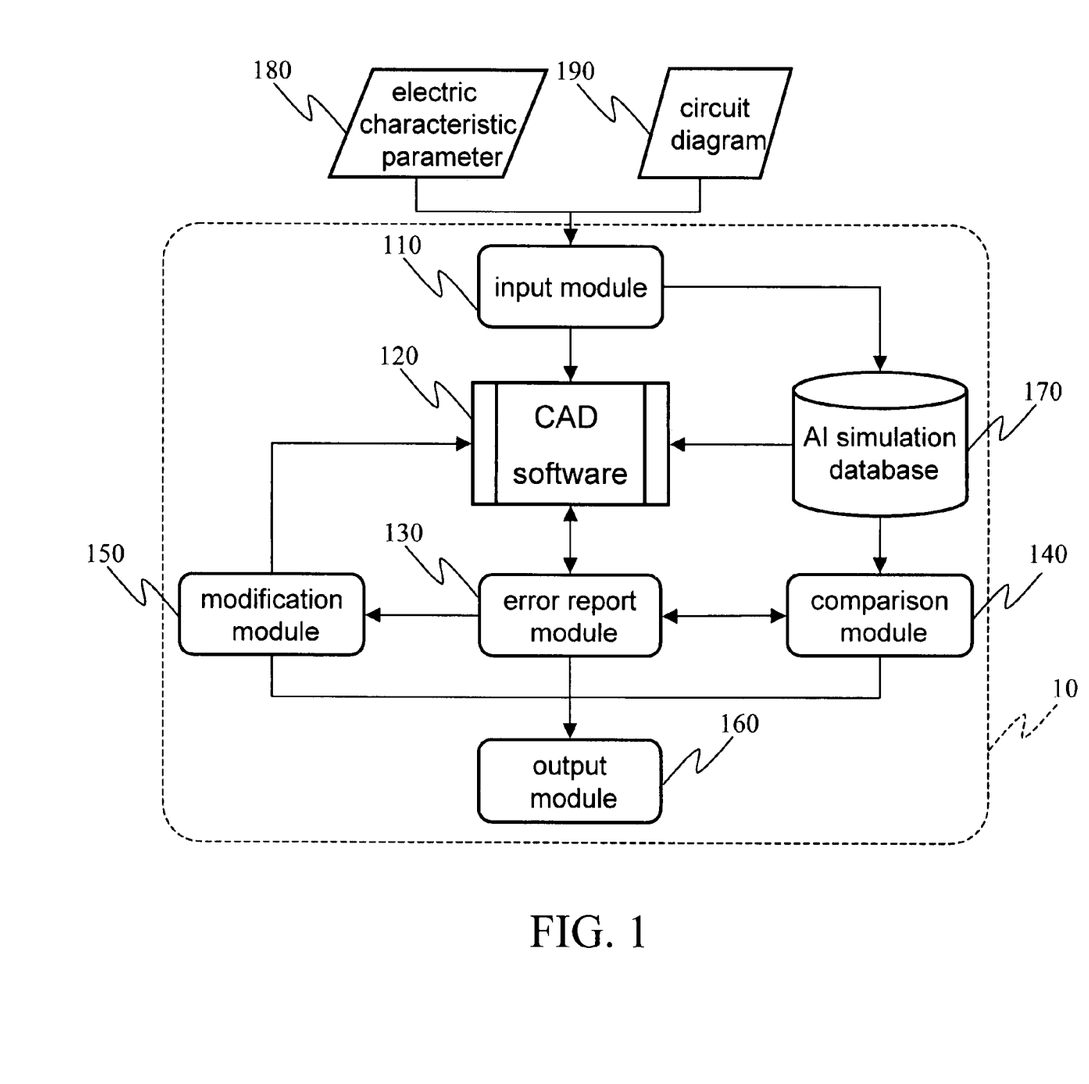
FIG. 1 is a system block diagram of the database-aided circuit design system of the invention.

As shown in FIG. 1, it is a system block diagram of the database-aided circuit design system according to one embodiment of the invention. The database-aided circuit design system 10 includes the following devices, which will be described in detail as follows.

An input module 110 is used to receive the electric characteristic parameters 180 of the electronic elements of the product and the circuit diagram 190 input by the user, wherein the electronic elements include all the active and passive elements, such as Integrated Circuit (IC), capacitor, inductor, resistor, connector, rectifier, PCB . . . etc. The electric characteristic parameters include the R.L.C. parameters. Further, the parameters of the PCB include the information relating to the following characteristics, such as stack-up, dielectric material, thickness, layer property (signal, power, prepreg, core . . . etc).

Computer-Aided-Design (CAD) software 120 is used to analyze and simulate real-life high speed circuit operations according to the electric characteristic parameter 180 of the electronic elements and the circuit diagram 190, and simulate certain specific properties of the designed products, such as the electronic behavioral specification characteristics of the input/output PIN by means of the I/O Buffer Information Specification (IBIS) model. Further, the CAD software is used to modify the original circuit design by utilizing the result of the analysis based on the distance between the dispositions of the electronic components and the spacing between the circuits by making use of the Maxwell electric-magnetic theory simulating the signal integrity, crosstalk, electric-magnetic compatibility . . . etc, as such saving the time spent on and frequency of design revisions, and reducing investment needed for building prototypes.

Figure 2:
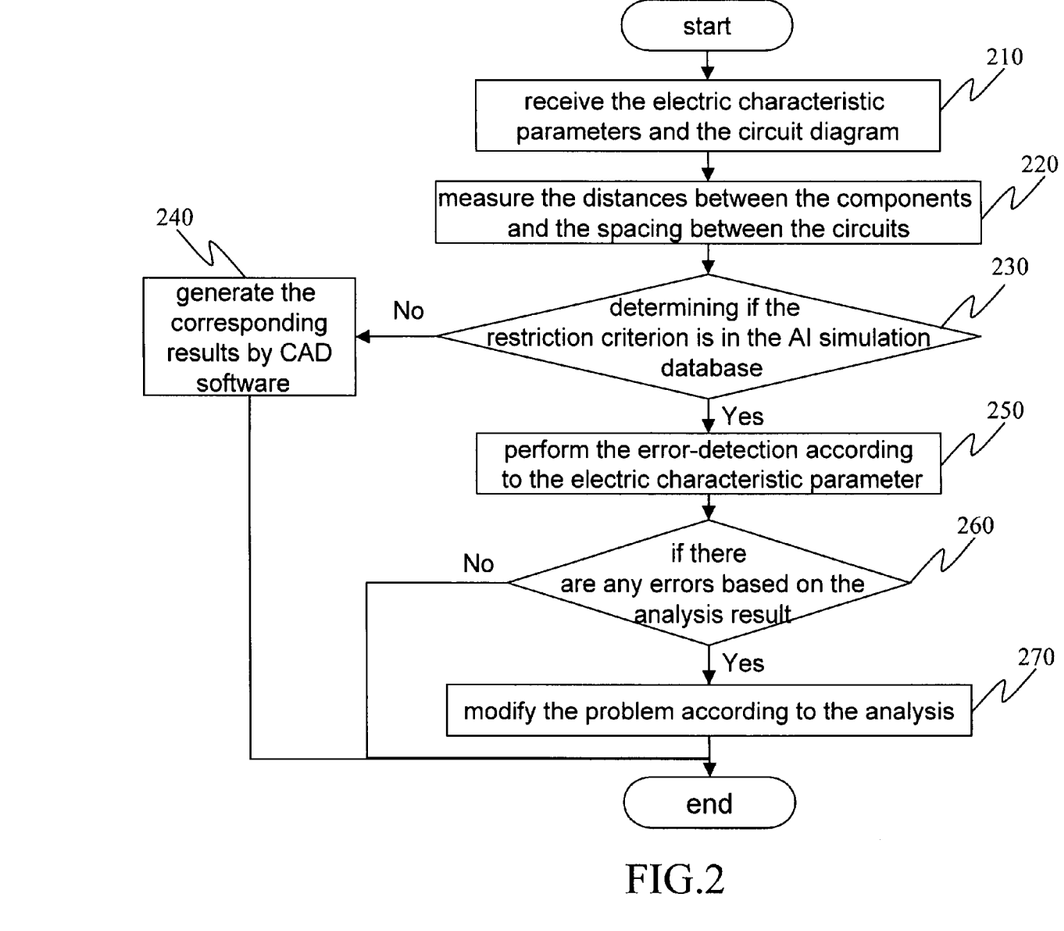
FIG. 2 is a flowchart of the steps of an early-design stage error-detection procedure of the database-aided circuit design method according to one embodiment of the invention.
Figure 4A:
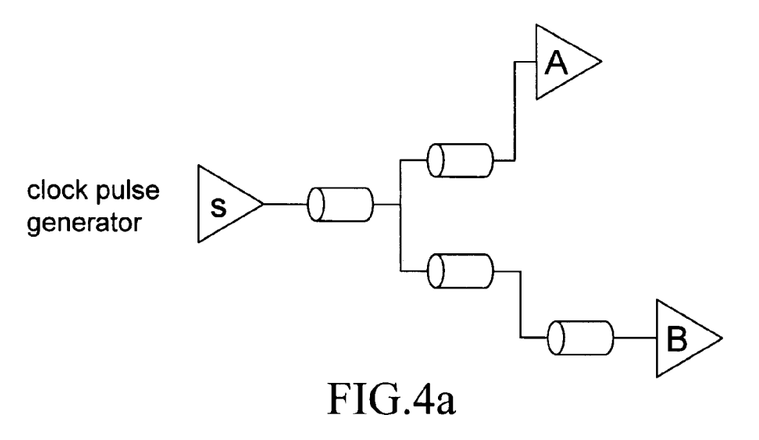
FIG. 4a is a schematic diagram of the problem circuit of the invention.

An artificial intelligence simulation database 170 is used to record the restriction criterion of the circuit design, electric model assignment, model for generated problem and solution, to generate the determination criterion for the optimized circuit and achieve early design stage error detection and post production stage error diagnosis. In this respect, referring to FIG. 2, it is a flowchart of the steps of an early design stage error-detection procedure of the database-aided circuit design method according to one embodiment of the invention. As shown in FIG. 2, the input module 110 is utilized to receive the electric characteristic parameters 180 of the electronic elements and the circuit diagram 190 input by the user (step 210). Next, as shown in FIG. 4a, it is a schematic diagram of the problem circuit, wherein the circuit from a clock pulse generator s to a device A and a device B is used to form a T topological structure. Thus, the distances between the components and the spacing between the circuits must be calculated (step 220). Then, determining if the related restriction criterion is in the artificial intelligence simulation database 170 (step 230). Finally, if the answer is negative, then the CAD software 120 is used to generate the corresponding results based on the previous design circuit and make an appropriate conclusion (step 240).

Supposing there is a restriction criterion for the T shape topological structure in the artificial intelligence simulation database 170 specifying that the timing skew of the signals from the clock pulse generator s to device A and device B must be within 0.1 ns to achieve the same waveform at devices A and B as required by the system. Likewise, the error detection according to the electric characteristic parameter 180 of the component is performed (step 250). For example, the relations between the trace length of the PCB vs. the signal reflection are measured, the impact of spacing between two high-speed signals on the effect of signal quality coupling is measured, and the impact of PCB stack-up on the signal characteristic impedance is measured. As such, according to the result of the measurement of the present embodiment, it is found that the trace length from the clock pulse generator s to device A is 2.14 inches, while the trace length from the clock pulse generator s to device B is 3.22 inches. Then, determining if there are any errors based on the analysis result (step 260), and according to the present embodiment, the measured time delays of signal transmission from the clock pulse generator s to devices A and B are 0.34 ns and 0.464 ns respectively, namely, the time difference is 0.124 ns, which is not compatible with a time difference of 0.1 ns as required by the restriction criterion. Then the error report module 130 is used to display the problems found in the analysis conducted by the CAD software 120, by making use of the artificial intelligence simulation database 170. Finally, the comparison module 140 is used to search the artificial intelligence simulation database 170 for the solution relating to this problem, and reach the solution to adjust the lengths of the two traces in order to have the same length (step 270).

Figure 4B:
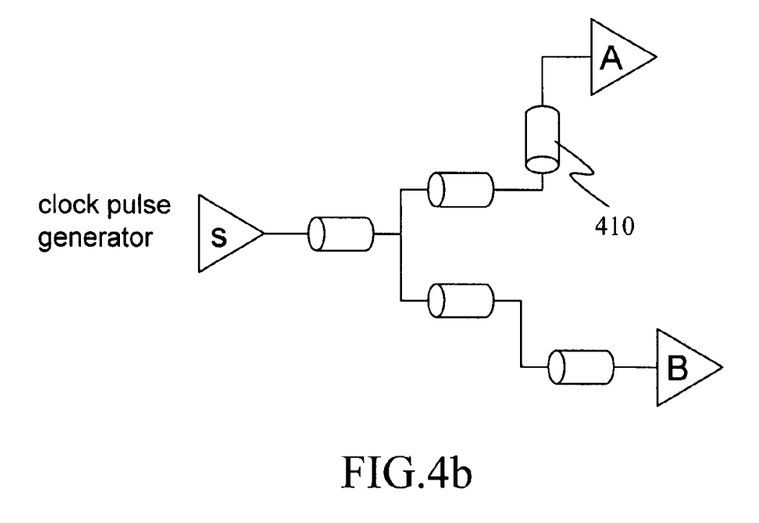
FIG. 4b is a schematic diagram of the amended circuit of the problem circuit of FIG. 4a of the invention.

Consequently, as shown in FIG. 4b, the modification module 150 is utilized by the user to make revisions of the electric characteristic parameters 180 of the input elements shown on the circuit diagram 190, namely, an electronic element 410 is added to the circuit, to increase the time delay from the clock pulse generator s to device A. Upon completion of adding the additional element, the CAD software 120 is utilized to perform the simulation and analysis of the circuit design again, and it is found after the revision that the trace length from the clock pulse generator s to device A is lengthened to 3.13 inches, while the time delay is increased to 0.452 ns. Therefore, the time needed for the clock pulse to travel from the clock pulse generators s to device A and B is 0.464 ns−0.452 ns=0.012 ns. Through the above modification, the requirement that the clock pulse timing difference of less than 0.1 ns for the T shape topological structure is achieved, thus balancing the transmission load on the two paths. Finally, the optimized circuit design is output by the output module 160.

Figure 3:
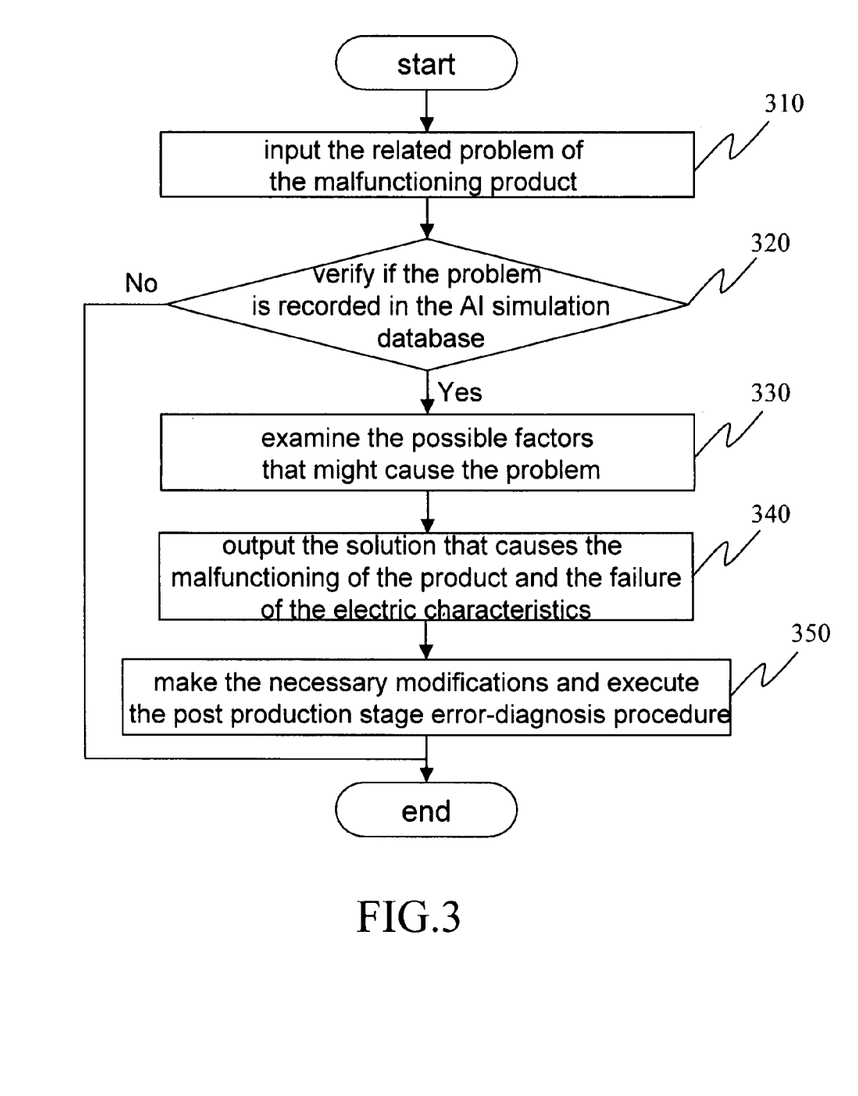
FIG. 3 is a flowchart of the steps of a post-production stage error-detection procedure of the database-aided circuit design method according to one embodiment of the invention.

As shown in FIG. 3, it is a flowchart of the steps of a post-production stage error-detection procedure of the database-aided circuit design method according to an embodiment of the invention, including the following steps.

Figure 5:
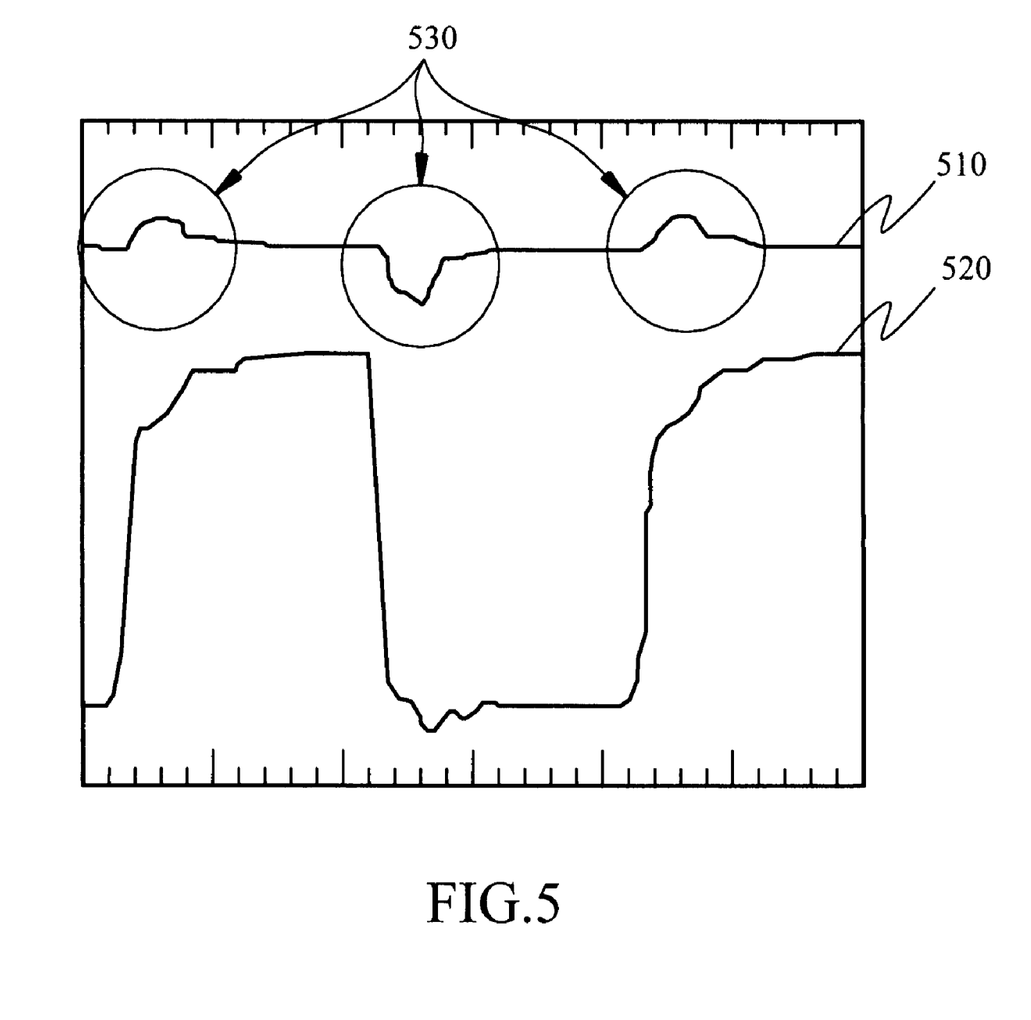
FIG. 5 is a schematic diagram of the waveforms transmitted along the two traces of the T shaped topological structure of the invention.

Firstly, upon selecting by the user through the items of the input module 110 to proceed with the error detection, the error report module 130 is used to process the information relating to the problem of the malfunctioning product input by the user (step 310). As shown in FIG. 5, it is a schematic diagram of the waveforms is transmitted along the two traces of the T shape topological structure. The first circuit waveform 510 should be a smooth waveform. However, in reality abnormal waveforms 530 occur. Thus, upon receiving the input of this problem by the error report module 130, the comparison module 140 is used to verify if the problem is recorded in the artificial intelligence simulation database 170 (step 320).

Figure 6A:
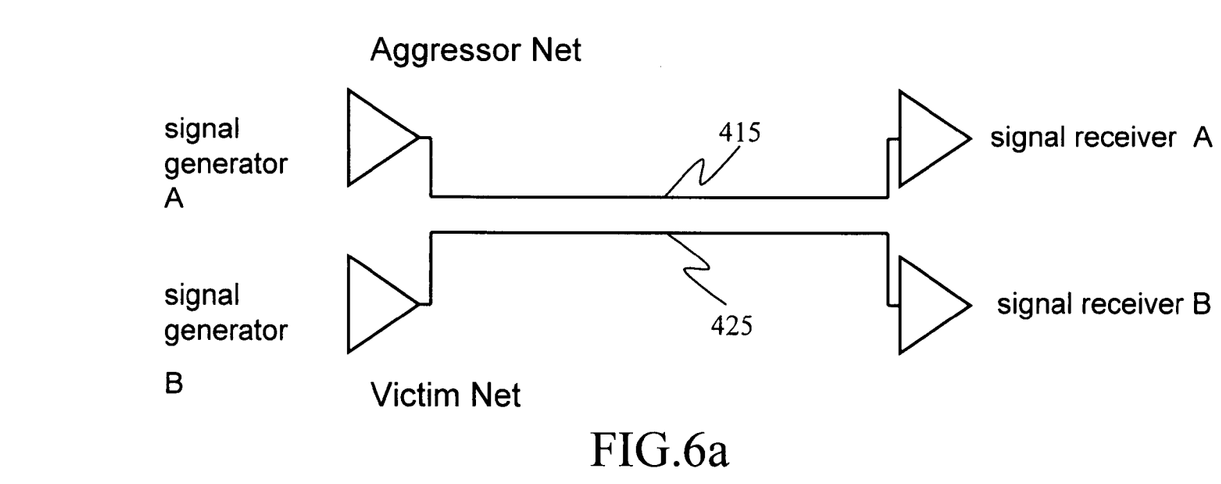
FIG. 6a is a schematic diagram of the circuits having the problem of crosstalk according to one embodiment of the invention.
Figure 6B:
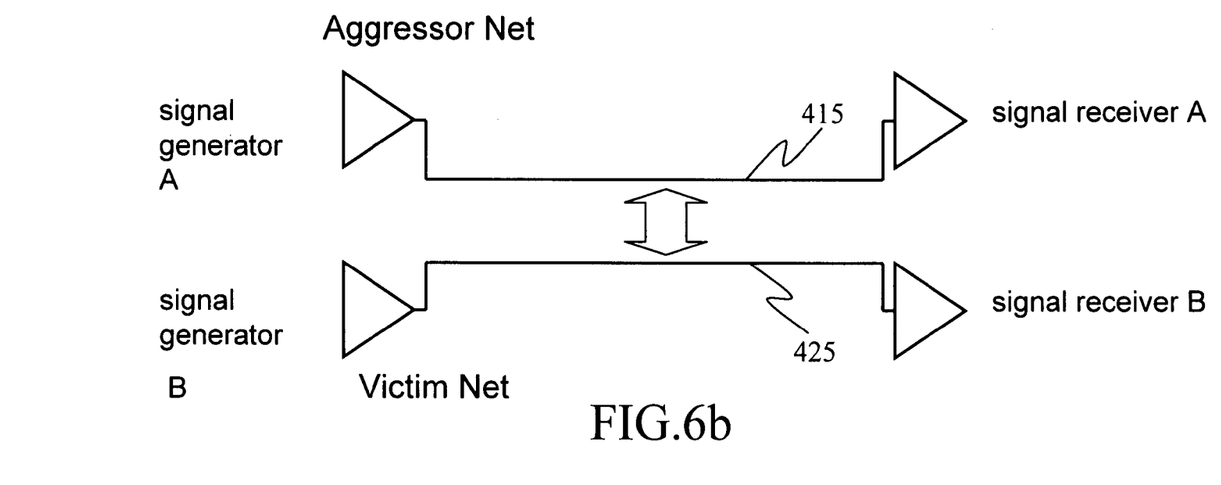
FIG. 6b is a schematic diagram of the amended circuits of the circuit in FIG. 6a according to one embodiment of the invention.

If it is found that such a kind of problem is recorded in the artificial intelligence simulation database 170, then the possible factors that might cause this problem are examined (step 330). For instance, it may be the interference phenomenon caused by the crosstalk, then according to the electric characteristic parameter 180 of the components and the circuit diagram 190, as shown in FIG. 6a, the first circuit 415 is connected from the signal generator A to the signal receiver A and generating the first circuit waveform 510. Further, the second circuit 425 is connected from the signal generator B to the receiver B and generating a second circuit waveform 520. Since the cause of crosstalk is that the distance between the two circuits is too close, in practice, it is found that the distance between the two circuits is only 15 mils (a thousandth of an inch) as measured by the CAD software 120. In this short distance, the crosstalk voltage exerted by the second circuit 425 on the first circuit 415 could reach 197 mV, which is much greater than the standard value 100 mV as specified in the record of the artificial intelligence simulation database 170. Thus the solution to this problem that causes the malfunctioning of the product and the failure of the electric characteristics is outputted as shown in FIG. 6b, namely, increasing the distance between two circuits from 15 mils to 25 mils (step 340). Finally, upon making the necessary modifications by the modification module 150 according to the solution, the error-diagnosis based on the post production stage error-diagnosis procedure described in conjunction with FIG. 3 is executed again(step 350), and it is found that after modification, the crosstalk voltage between the two circuits is reduced to 98 mV. In measuring the first circuit waveform 510 of the first circuit 415, it is found that the abnormal waveform 530 has been eliminated. As such, it is verified that the crosstalk interference problem is solved, thus achieving the objective of high-speed automatic early design stage error-detection and post-production stage error-diagnosis of the circuit design.

Summing up the invention above, through the application of the system and method therefore of the invention, the problem of the product can be detected in the early design stage before it is put into actual production. This can be used to generate a determination criterion for an optimized circuit and stabilize the electric characteristics of the product, thus reducing the number of trial runs required for the manufacturing of a PCB and lowering the design and production costs. After the actual production, the problem of the product discovered can be solved by tracing the possible causes and factors that cause this problem in the shortest possible time, by making use of the artificial intelligence simulation database, hereby shortening the market delivery time of the product and sharpening the competitive edges of the company.

Knowing the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A database-aided circuit design system, comprising:
    an input module, used to receive a plurality of electric characteristic parameters of components and a plurality of circuit diagrams input by a user;
    an auxiliary software, used to execute simulation and analysis according to the electric characteristic parameters of the components and the circuit diagrams;
    an artificial intelligence simulation database, used to record a plurality of design restriction criteria, a timing skew model, and solution procedures;
    an error report module, used to display a plurality of problems found by the auxiliary software through analysis by making use of the artificial intelligence simulation database; and
    a comparison module, used to search the respective problem records and the solution procedures in the artificial intelligence simulation database for the plurality problems found by the auxiliary program.

2. The database-aided circuit design system as claimed in claim 1, wherein the system further comprising a modification module, which is used to perform the various modifications of the electric characteristic parameters of the components and the circuit diagrams.

3. The database-aided circuit design system as claimed in claim 1, wherein the system further comprising an output module, which is used to output the modified electric characteristic parameters of the components and the modified circuit diagrams.

4. The database-aided circuit design system as claimed in claim 1, wherein the error report module is further used to receive a plurality of problems for post-production stage diagnosis input by the user.

5. The database-aided circuit design system as claimed in claim 1, wherein the auxiliary software is computer-aided-design (CAD) software.

6. A database-aided circuit design system, comprising:
    an input module, used to receive a plurality of electric characteristic parameters of components and a plurality of circuit diagrams input by a user;

an auxiliary software, used to execute simulation and analysis according to the electric characteristic parameters of the components and the circuit diagrams;

an artificial intelligence simulation database, used to record a plurality of design restriction criteria, a crosstalk interference model, and solution procedures;

an error report module, used to display a plurality of problems found by the auxiliary software through analysis by making use of the artificial intelligence simulation database; and a comparison module, used to search the respective problem records and the solution procedures in the artificial intelligence simulation database for the plurality problems found by the auxiliary program.

7. The database-aided circuit design system as claimed in claim 1, wherein the system further comprising a modification module, which is used to perform the various modifications of the electric characteristic parameters of the components and the circuit diagrams.

8. The database-aided circuit design system as claimed in claim 1, wherein the system further comprising an output module, which is used to output the modified electric characteristic parameters of the components and the modified circuit diagrams.

9. The database-aided circuit design system as claimed in claim 1, wherein the error report module is further used to receive a plurality of problems for post-production stage diagnosis input by the user.

10. The database-aided circuit design system as claimed in claim 1, wherein the auxiliary software is computer-aided-design (CAD) software.

* * * * *